April 12, 1960

W. C. REIMAN

2,932,573

METHOD FOR TREATING MEAT

Filed May 13, 1957

INVENTOR
W. C. REIMAN.
BY
ATTORNEY

April 12, 1960 W. C. REIMAN 2,932,573
METHOD FOR TREATING MEAT
Filed May 13, 1957 5 Sheets-Sheet 3

INVENTOR
W. C. REIMAN
ATTORNEY

April 12, 1960  W. C. REIMAN  2,932,573
METHOD FOR TREATING MEAT
Filed May 13, 1957  5 Sheets-Sheet 4

INVENTOR.
W. C. REIMAN
BY
ATTORNEY

April 12, 1960  W. C. REIMAN  2,932,573
METHOD FOR TREATING MEAT
Filed May 13, 1957  5 Sheets-Sheet 5

INVENTOR.
W. C. REIMAN.
BY
ATTORNEY.

United States Patent Office 2,932,573
Patented Apr. 12, 1960

2,932,573

METHOD FOR TREATING MEAT

Walter C. Reiman, Cincinnati, Ohio, assignor of one-half to Westinghouse Electric Corporation, East Pittsburgh, Pa., a corporation of Pennsylvania, and one-half to The Kroger Co., Cincinnati, Ohio, a corporation of Ohio Application May 13, 1957, Serial No. 658,596

10 Claims. (Cl. 99—107)

This invention relates to a method for treating meat and, more particularly, to a method for accelerating enzymic activity as required to tenderize meat. This application is a continuation-in-part of application Serial No. 383,553, filed October 1, 1953, now abandoned, titled "Apparatus and Method for Treating and Storing Meat" by Walter C. Reiman, the inventor herein, which application S.N. 383,553 is a continuation-in-part of application Serial No. 198,260, now abandoned, filed November 30, 1950, titled "Apparatus and Method for Treating and Storing Meat" by Walter C. Reiman, the inventor herein.

For many years meat has been hung in a processing room at a controlled temperature in order that the enzymic activity will bring about a chemical change within the body of the meat in order to tenderize it. The rate of enzymic activity is dependent upon the temperature of the meat-treating room and the higher the temperature the greater the enzymic activity. In Patents No. 2,169,081 and 2,192,348 to James are described a method and apparatus which enable meat to be processed at a much higher temperature without encountering mold and bacterial formations on the surface of the meat, which formations are normally encountered at higher meat-treating temperatures. This is accomplished by irradiating the meat while in the treatment room with ultraviolet radiations which inhibit bacterial and other formations. Many millions of pounds of beef are processed annually by the tenderizing techniques described by James in these aforementioned patents.

In the usual practices of meat processing, the animal is killed and dressed, and in the case of beef the internal temperature is about 105° F. The dressed beef carcasses are then put into a cold room and chilled to an internal temperature, measured at the center of the round, of from about 45° F. to 59° F. This chilling process takes from about 24 to about 32 hours, and the time required will vary with the size of the carcass. The primary purpose of this initial chilling is to prevent bone sour and it has been determined empirically that if the carcass is under 550 pounds in weight, it should be kept in chill from 24 to 26 hours until a chilled temperature, as measured at the center of the round, of from 54° F. to 59° F. is achieved. If the carcass weighs from 550 to 675 pounds, it preferably is kept in chill from 26 to 28 hours, at which time the chilled temperature as measured at the center of the round will be from 51° F. to 56° F. If the carcass weighs over 675 pounds, it is preferably kept in chill from 28 to 32 hours, at which time the chilled temperature as measured at the center of the round will be from 45° F. to 52° F. Since the chilling room preferably is at a temperature of about 34° F., the surface temperature of the carcass will be slightly below the internal temperature. For example, if the chilled temperature as measured at the center of the round is about 57° F., the surface temperature normally will be about 50° F. and if the chilled temperature as measured at the center of the round is about 45° F., the surface temperature of the carcass normally will be about 41° F. After this pre-chilling, the meat carcasses, or cuts as the case may be, may be placed into the treatment room for tenderizing.

In the actual practice of the meat-treating system described by James in his aforementioned patents, wherein enzymic action is accelerated by higher meat temperatures while surface bacterial and other action is inhibited by ultraviolet radiations, the preferred ambient temperature for the treating compartment is about 67–68° F. Beef which loses appreciable moisture will lose quality and in order to prevent the beef from losing appreciable moisture to the atmosphere of the meat-treatment room, the relative humidity of the treatment room is preferably maintained at from 80 to 90%, for example, and preferably toward the lower end of this range. This relatively high treating temperature and relatively high humidity raises the problem that when prechilled carcasses are placed into the relatively warm and humid treating room, moisture will condense from the atmosphere of the treating room onto the surfaces of the prechilled carcasses. This moisture condensation increases the possibility of growth of bacterial and other formations and in addition leaches some of the serum solids from the red meat, thereby allowing the residue of the leached portions to form black spots or streaks when the water evaporates. In addition, the blue grade stamp on the meat has a tendency to run when the water condenses thereon and, as will be explained hereinafter, meat which has water condensing thereon does not heat or warm up as fast as when moisture condensation is prevented. Also, the natural bloom of red meat is impaired by the formation of moisture thereon and the fat and lean portions may actually develop odors.

The problem of condensation of moisture on the prechilled beef has been attacked in various ways. One of the most-used ways is to rub down the beef continually until its surface temperature has increased to that temperature where moisture no longer condenses thereon from the relatively humid atmosphere of the treatment room. This involves considerable hand labor and is not entirely satisfactory. Other systems have also been suggested for preventing the condensation of moisture on the surface of the meat, as outlined in Patent No. 2,419,119 to Christensen. In the system outlined in this patent to Christensen, when prechilled meat is first introduced into the treatment room, the ambient temperature of this treatment room is increased for a short period to about 80° F. to 90° F. The dew-point temperature of the atmosphere in the treatment room, however, is determined by the water-spray temperature of the apparatus as outlined in this Christensen patent, which water-spray temperature is set at about 56° F. This has the effect that any meat having a surface temperature appreciably below 56° F. will have an appreciable amount of moisture condensed thereon with the attendant disadvantages as outlined hereinbefore. The technique disclosed by Christensen will hasten the evaporation of the moisture which does condense on the meat since the relative humidity is deliberately lowered in the treatment room for the short period, but this system will not prevent moisture condensation on the surface of any meat which has a surface temperature below the dew-point temperature of the atmosphere of the treating room. Also, the relatively low humidity will result in some drying-out of the meat.

It is the general object of this invention to avoid and overcome the foregoing and other difficulties of and objections to prior art practices by the provision of a meat-treating method wherein moisture condensation on the surface of meat undergoing tenderizing treatment is prevented at all times, without sacrificing any of the quality of the tenderized meat.

It is a further object of this invention to provide a method for treating meat wherein bactericidal growth is inhibited, the natural bloom of the red meat is preserved and odors on the meat are prevented.

It is another object of this invention to provide a method for treating meat wherein enzymic action is accelerated.

It is still another object to provide modifications to the basic method for operating the meat-treating apparatus.

The aforesaid objects of the invention, and other objects which will become apparent as the description proceeds, are achieved by providing a method for tenderizing meat wherein the meat is placed into a treating room having an ambient temperature which is controlled in accordance with a predetermined time schedule in order to raise the temperature of the prechilled meat to a predetermined meat-treating temperature. The surface of the meat while in the treatment room is irradiated with ultraviolet radiations in order to kill bacteria and other organisms on the surface of the meat. In addition, the dew-point temperature of the treatment room is controlled in accordance with a predetermined time schedule so that it is always slightly below the surface temperature of the meat as it is treated.

For a better understanding of the invention reference should be had to the accompanying drawings, wherein.

The moisture or water vapor in the atmosphere of the treating comparmtent may be expressed in terms of dew-point temperature or as it is commonly abbreviated, dew-point. The dew-point temperature is the temperature at which the condensation of water vapor in a space begins for a given state of humidity and pressure as the temperature of the vapor is reduced or, otherwise expressed, the temperature corresponding to saturation (100% relative humidity) for a given absolute humidity at constant pressure. In the instant examples, the pressure within the treating compartment is assumed at all times to be 760 mm. mercury.

Dry-bulb temperature is the temperature of a gas or mixture of gases indicated by an accurate thermometer and the dry-bulb temperature of the atmosphere within the meat-treating compartment will be referred to hereinafter as the treating compartment ambient temperature.

Wet-bulb temperature is the temperature indicated by a wet-bulb psychrometer constructed and used according to specifications (A.S.M.E. Power Test Codes, Series 1932, Instruments and Apparatus, Part 18). Wet-bulb temperature at 53° F. is the arithmetic mean between the dew-point temperature and the ambient or dry-bulb temperature. At higher temperatures the reading of the wet bulb is lower than this mean and at lower temperatures it is higher. Wet-bulb temperature is convenient in determining dew-points.

Relative humidity is the ratio of actual partial pressure of the water vapor in a space to the saturation pressure of pure water at the same temperature.

Figure 1:
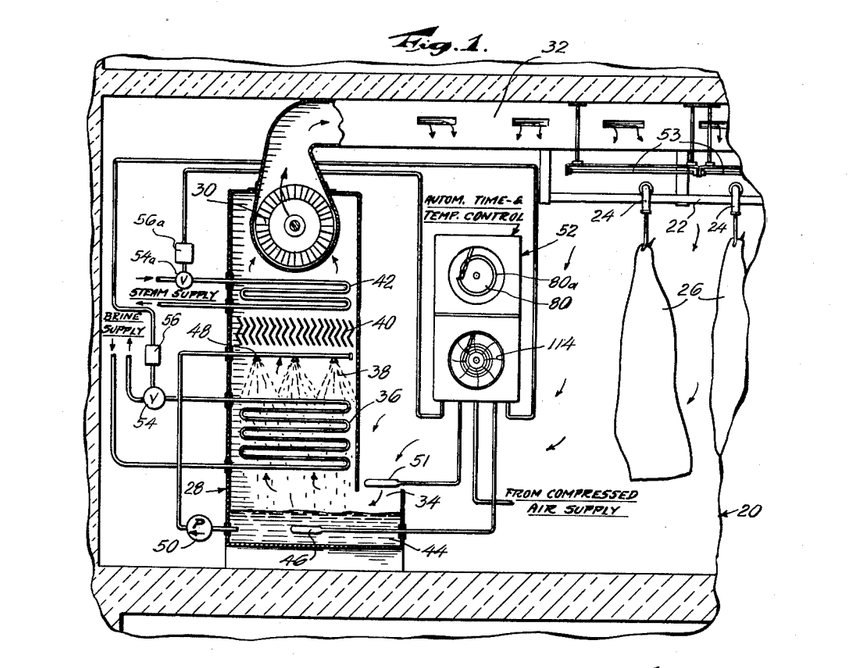
Fig. 1 is a fragmentary vertical elevation of a meat-treating compartment and associated air-conditioning means for controlling the ambient and dew-point temperatures of the treating compartment.

With specific reference to the form of the invention illustrated in the drawings, in Fig. 1 is shown a portion of a meat-treating compartment 20 which contains the meat during the meat-treating period. The overhead or ceiling of the compartment has rails 22 suspended therefrom to which are affixed meat hooks 24 for supporting the meat carcasses 26 undergoing treatment. Associated with the meat-treating compartment 20 and preferably positioned adjacent thereto is a separate air-conditioning chamber 28 which holds the dew-point and temperature-control equipment, as explained hereinafter. Of course the air-conditioning chamber 28 may be located within compartment 20 or removed therefrom.

In the preferred embodiment, the atmosphere in the air-conditioning chamber 28 is circulated continually by means of a blower fan 30 which carries the air-conditioned atmosphere from the air-conditioning chamber 28, through air-distributing ducts 32 and into the meat-treating compartment 20. The return air-flow is from the meat-treating compartment 20 and through a return passage 34, after which the air is again passed through the air-conditioning chamber 28 and is again recirculated. The air-conditioning apparatus generally comprises cooling coils 36, a water-spray system 38, moisture-droplet-removing baffles 40, and heating coils 42 along with their associated control apparatus, as explained hereinafter.

At the bottom portion of the air-conditioning chamber 28 is provided a cooling-water reservoir 44 and the temperature of the water contained in this reservoir 44 is measured by temperature-sensitive bulb 46 which is immersed in the water. The spray water is pumped from the reservoir through a spray pipe and through nozzles 48 by means of a pump 50 and is sprayed over the cooling coils 36 which are cooled by brine pumped from a brine supply (not shown). The rate of flow of the brine in the cooling coils 36 is controlled by the temperature of the water in reservoir 44, as measured by temperature-sensitive bulb 46, and by the dew-point control apparatus, as explained hereinafter. The air which is passed through the water spray will be substantially saturated with moisture and the dew-point of the air which is pumped into the meat-treating compartment 20 by the blower 30 will be determined by the temperature of the water spray 38. After passing the water spray 38, the now-substantially-saturated air is passed through baffles 40 to remove droplets of moisture therefrom and is then passed through heating coils 42 in order to heat the air to the ambient temperature desired in the treating compartment 20, which ambient temperature is measured by the temperature-sensitive bulb 51 positioned adjacent the air-return passage 34, which connects the meat-treating compartment 20 with the air-conditioning chamber 28.

The dew-point of the air which is forced into the compartment 20 is varied in accordance with a predetermined time-schedule so that the dew-point of the atmosphere within the compartment 20 will always be slightly below the surface temperature of the meat which is being treated and variations in dew-point are effected by a dew-point-control apparatus 52, which controls the rate of flow of brine through cooling coils 36. Of course refrigerants other than brine may be used. Also included in the meat-treating compartment are ultraviolet-generating lamps 53, such as sold under the trademark "Sterilamp" and these lamps may be as described in Patent No. 2,258,765 to James. These ultraviolet-generating lamps are desirably positioned above the meat and are provided with reflectors to direct the radiations downwardly toward the meat undergoing treatment. Preferably the lamps are protected from the strongest air currents in order that they will operate more efficiently and such protection may be effected by the positioning of the lamps and by the reflectors over the lamps. It is desirable although not mandatory to produce a limited amount of ozone in the meat-treating compartment and such ozone may be produced by fabricating the envelopes of the lamps described by James in Patent No. 2,258,765 of a material which is transmissive to 1850 A.U. For example, every fourth lamp used may be an ozone-producing lamp. The ultraviolet concentration may vary within wide ranges, but as an example it has been found convenient to use one lamp for every twenty square feet of floor space where treating beef carcasses and one lamp for every fifteen square feet of floor space where treating beef cuts. As an example, the ultraviolet lamps may have an output of from twenty to forty microwatts of energy per square centimeter measured at one meter from each lamp.

Figure 2:
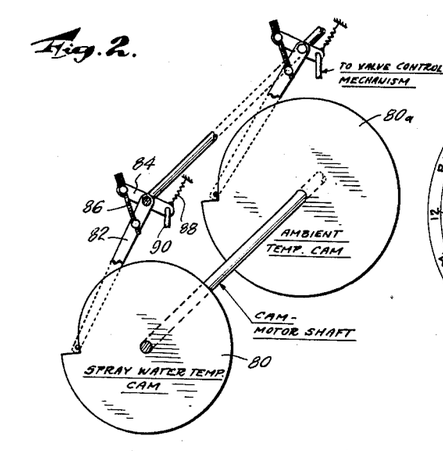
Fig. 2 is a fragmentary diagrammatic view of the control cams and associated linkage for varying the dew-point and ambient temperatures of the compartment.
Figures 4, 5:
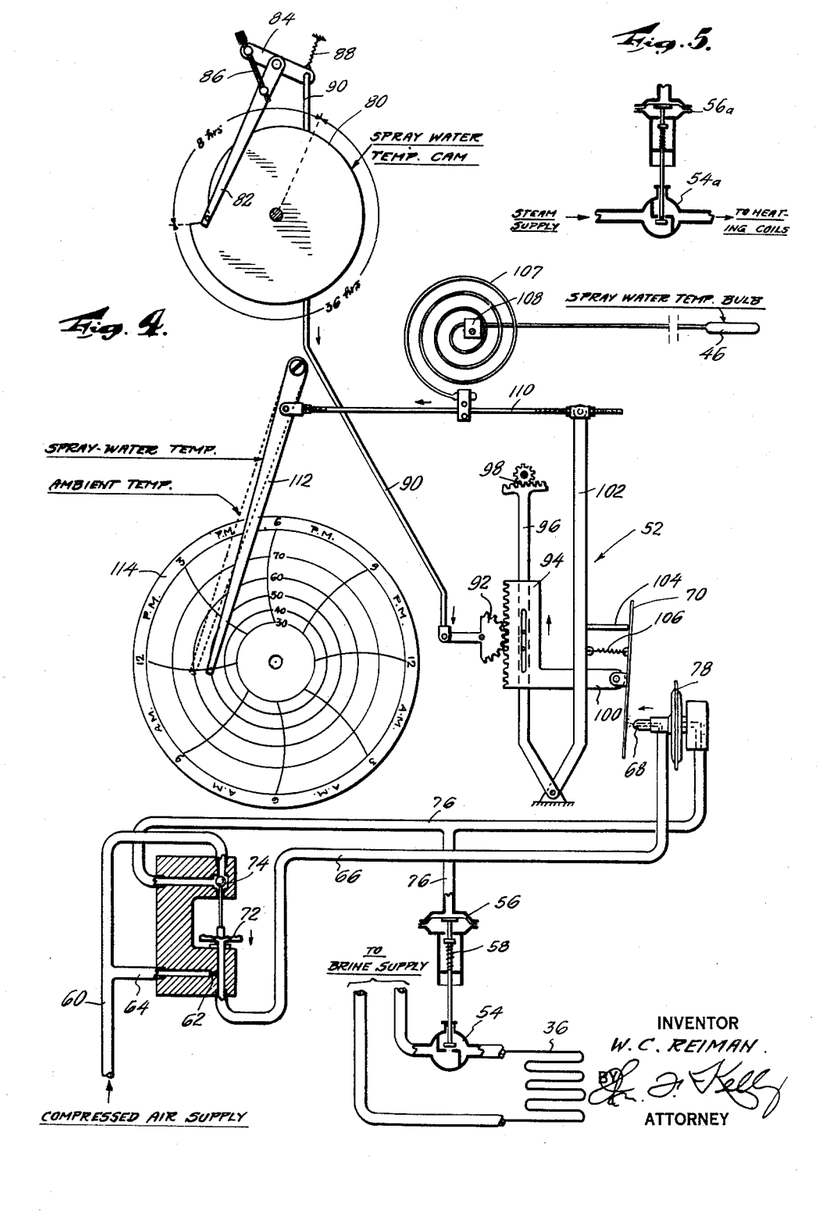
Fig. 4 is an expanded elevational view, partly in section, illustrating the dew-point control mechanism and controls therefor.
Fig. 5 is a sectional elevation of the steam-supply valve and a part of the controlling means therefor.

In Figs. 2 and 4 are illustrated the details of the dew-point control apparatus 52. A brine-control globe valve 54, shown in block diagram in Fig. 1 and in sectional view in Fig. 4, throttles the flow of brine through the cooling coils 36 in accordance with the desired dew-point temperature. The globe valve 54 is controlled with respect to degree of closure by a bellows control 56, shown in block diagram in Fig. 1 and in section in Fig. 4. The globe valve 54 is normally urged to an open position by a spring 58 in the bellows control 56. Control of this valve 54 is achieved by a compressed-air system wherein compressed air is forced through supply pipe 60 and through a restriction 62 in bleeder pipe 64. The compressed air then passes through pipe 66 and to an orifice 68. Flow of air from the orifice 68 is controlled by the positioning of a baffle 70, as explained in detail hereinafter, and the air pressure in pipe 66 is thus controlled by the rate of flow of the compressed air through the orifice 68. A higher air pressure in pipe 66 acts to expand bellows 72 and to close ball valve 74, which in turn decreases the air pressure in pipe 76. This in turn allows the globe valve 54 to open wider since the bellows 56 moves upwardly. This in turn will allow more cooling brine to flow through the coils 36 which will decrease the dew-point temperature accordingly.

An additional bellows 78 may be provided adjacent the nozzle 68 so that its action is controlled by the pressure differential between pipes 66 and 76. Thus an increased pressure at the nozzle 68 will collapse the bellows 78 somewhat and decrease the sensitivity of the apparatus, if desired.

The spray-water-temperature cam 80, as shown in Figs. 2 and 4, is cut to increase the dew-point temperature over the first eight hour period of treatment, for example, and thereafter is set to hold the dew-point temperature substantially constant over the remainder of the meat-treating period, which in this specific example is shown as being 36 hours. In the operation of this spray-water-temperature or dew-point control cam 80, one end of an arm 82 rides on the cam 80 and the other end of arm 82 is affixed to a connecting lever 84. A fine adjustment 86 is provided between the arm 82 and the connecting lever 84 and the connecting lever is normally urged in a counterclockwise direction by spring 88 in order to force the arm 82 against the cam 80. As the cam rotates in a counterclockwise direction with the passage of time, the connecting lever 84 is forced in a clockwise fashion and in turn actuates connecting linkage 90 to force it downwardly. Connecting linkage 90 connects to an extension of a gear segment 92 which is pivotally connected to the frame of the dew-point control apparatus 52. A downward motion of the linkage 90 causes the gear segment 92 to rotate in a counterclockwise fashion which raises or elevates the rack 94 accordingly.

Rack 94 rides on a first supporting arm 96 which is pivoted at its base on the frame of the control apparatus 52 and a fine adjustment 98 is provided at the upper end of the supporting arm 96 for initially adjusting the equipment. A connecting arm 100 extends from the rack 94 and the baffle 70 is pivotally mounted on the end of this arm 100. A second supporting arm 102 is pivotally mounted on the frame of the apparatus 52 and carries a baffle-positioning pin 104 and the baffle 70 is urged against this positioning pin 104 by means of a spring 106. The arm 102 operates to maintain the variable dew-point temperature at its desired controlled value, as explained hereinafter, but for purposes of simplified explanation at this point, it is assumed that the arm 102 remains stationary and that the rack 94 only moves upwardly and downwardly with respect to arm 102, in accordance with the rotation of the cam 80. As the rack 94 moves upwardly, the clearance between the baffle 70 and the nozzle 68 increases, thereby decreasing the air pressure in the pipe 66 which in turn deflates the bellows 72. This in turn opens the ball-check valve 74 an additional amount allowing a greater pressure of air to act upon the bellows 56 and thus moving the valve 54 toward a closed position. This in turn decreases the flow of brine through the cooling coils 36 and raises the dew-point temperature of the atmosphere within the treating compartment 20.

The dew-point control cam 80 will act to vary the dew-point temperature of the atmosphere within the compartment 20 in accordance with a predetermined time schedule, but variations in operating conditions will cause the dew-point temperature to vary somewhat from its desired value, as determined by the rotation of the cam 80. In order to control the dew-point at its predetermined value as per the time schedule, the temperature-sensitive bulb 46, as shown in Figs. 1 and 4 is connected to a Bourdon spring spiral 107. This spring spiral is connected to the frame of the apparatus 52 at its center portion 108 and the outer portion of the spring spiral 107 is connected to a control arm 110 at a point intermediate its ends. The arm 110 is in turn connected at one end to the supporting arm 102 and at the other end to a temperature-indicating arm 112. The temperature-indicating arm 112 is pivoted at its fixed end to the frame of the apparatus 52 and carries a temperature-recording pen at its other end. An increase in the temperature of the water in the reservoir 44 above the desired temperature will cause the Bourdon spring spiral 107 to expand and move the arm 110 to the left as shown in Fig. 4. This in turn will move the arm 102 to the left which will decrease the clearance between the baffle 70 and the nozzle 68, thereby opening the throttle valve 54 somewhat and allowing more brine to flow through the coils, which in turn reduces the dew-point temperature accordingly. A decrease in the temperature of the water contained in reservoir 44 will act in an opposite fashion. It can thus be seen that the dew-point cam 80 and associated apparatus act to vary the dew-point in accordance with a predetermined time schedule and the temperature-sensitive bulb 46 and its associated mechanism and linkage act to control the dew-point about the variable value which is established by the cam 80.

In Fig. 2 is shown the variable dew-point control cam 80 and also the ambient-temperature cam 80a which are preferably connected to the same shaft in order to simplify construction. The ambient-temperature control cam 80a operates with the temperature-sensitive bulb 51 to control the ambient temperature of the compartment 20 in accordance with a predetermined time-temperature schedule. The associated apparatus used to control this ambient temperature may be constructed as indicated for the variable dew-point control apparatus. In Fig. 5 are shown the steam throttle valve 54a which corresponds to brine throttle valve 54 and the corresponding steam-throttle-valve bellows control 56a, which control the flow of steam to the heating coils 42. Other than this the apparatus for varying the ambient temperature may be identical with the variable dew-point control apparatus.

Figure 3:
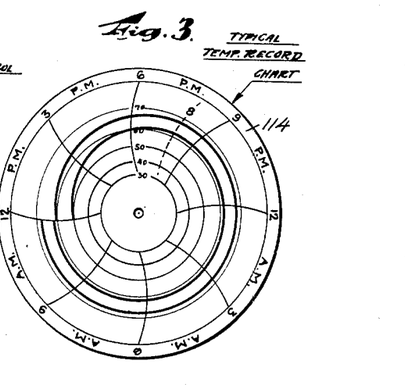
Fig. 3 illustrates a typical temperature-record chart.

In Fig. 3 is shown a typical time-temperature record chart 114 which will register an accurate history of the meat treating and such a chart is also shown in Figs. 1 and 4. Both dew-point and ambient-temperature records may be registered on the same chart, if desired.

Figure 6:
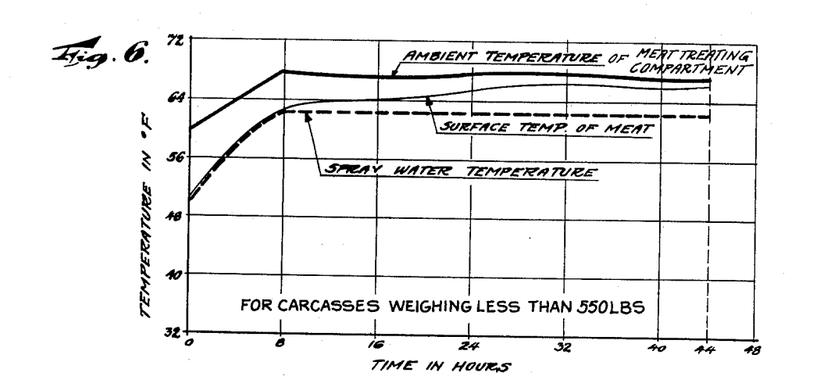
Fig. 6 is a chart showing the relationship of treating compartment ambient temperature vs. time showing the time-temperature relationships of the ambient temperature of the compartment, along with the surface temperature of the meat and the spray-water temperature of the compartment for meat carcasses weighing under 550 pounds.

A typical operation of the apparatus is graphically shown in Fig. 6 and for purposes of illustration, carcasses weighing less than 550 lbs. are undergoing treatment in this operation. When first placing the carcasses into the treatment room the surface temperature of the meat is assumed to be about 50° F. and the dew-point control cam 80 is set to vary the dew-point of the atmosphere within the treating compartment from an initial value of about 49° F. up to a value of about 63° F. over an eight-hour period. It is known from experiment with this size and temperature of carcasses, that if the dew-point is varied between these two values over the eight-hour period, while the ambient temperature is initially about 10° above the surface temperature of the meat, the surface temperature of the meat will always be slightly greater than the dew-point of the atmosphere. The temperature control cam 80a is set to increase the temperature through an eight-hour period from an initial value of about 60° to a final value of about 67° F. In order to obtain an optimum of enzymic action it is preferred to maintain the surface temperature of the meat undergoing treatment from about 63° F. to 67° F. and after the initial warming and as the meat is treated, its surface temperature will vary within this range, as indicated in Fig. 6. In all of the curves shown in Figs. 6 through 14 inclusive, the ambient temperature of the meat-treating compartment 20 is shown in heavy lines, the surface temperature of the meat undergoing treatment is shown in light lines and the spray water temperature which substantially corresponds to the dew-point temperature of the atmosphere within the treating compartment 20 is shown in dotted lines.

Figure 7:
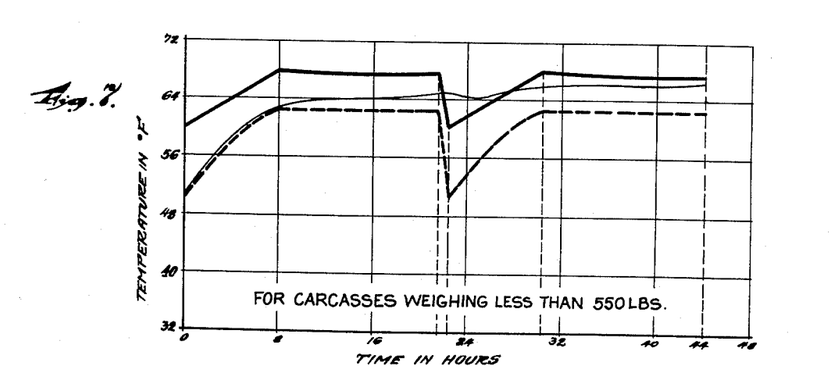
Fig. 7 is a chart corresponding to Fig. 6 except that meat is loaded on a daily basis into the treating compartment.

In Fig. 7 is shown the operation of the apparatus wherein meat is loaded daily with what may be termed a multiple-batch basis so that more than one batch may be treated at the same time in the same meat-treating compartment. In this manner of operation, an equal amount of meat can be removed from the treatment room every day although the preferred meat-treating period is approximately two days. In the operation of the system as disclosed in Fig. 7, at the end of the 24 hour period both the temperature-control cam 80a and the spray-water-temperature cam 80 are moved back to their initial position when the prechilled meat is loaded, in order that condensation of moisture on the surface of all the meat in the compartment 20 is avoided at all times.

Figure 8:
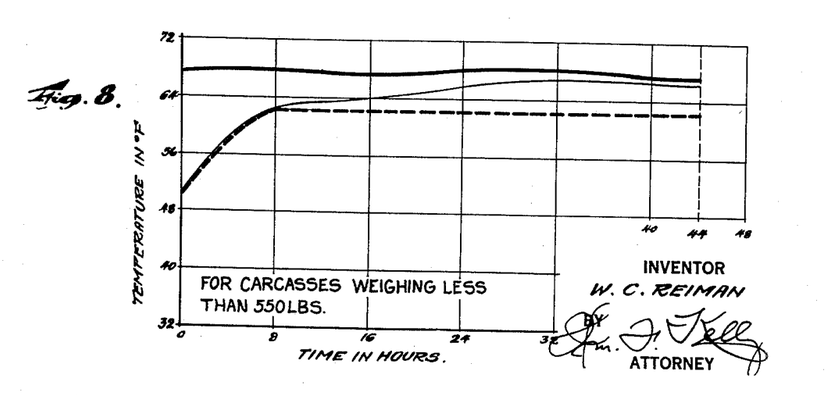
Fig. 8 is a chart corresponding to Fig. 6 except that the ambient temperature is maintained substantially constant and the dew-point is varied.

It is also possible to maintain the ambient temperature of the treating compartment substantially constant throughout the entire meat-treating period and to vary only the dewpoint and such an operation of the apparatus is shown in Fig. 8. This has the disadvantage of causing the meat to lose slightly more moisture initially until its surface temperature has increased, but it is not necessary to have a separate temperature-control cam. The apparatus as shown may be operated in this manner by disconnecting the temperature-control cam 80a and setting it to hold the ambient temperature at about 67° F.–68° F., for example.

Figure 9:
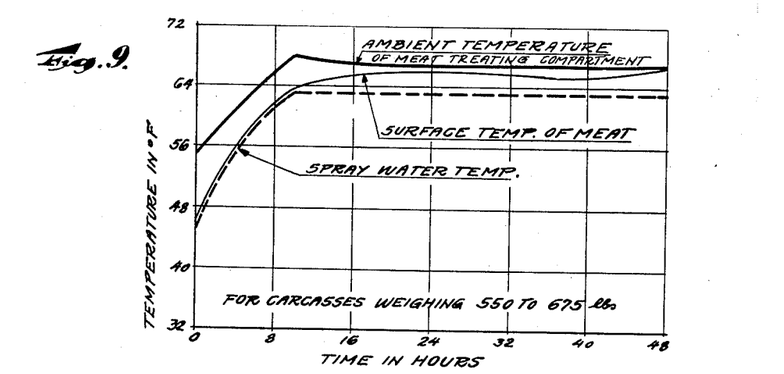
Fig. 9 is a chart corresponding to Fig. 6, but illustrating the corresponding temperature relationships when the carcasses being treated weigh from 550 to 675 pounds.
Figure 10:
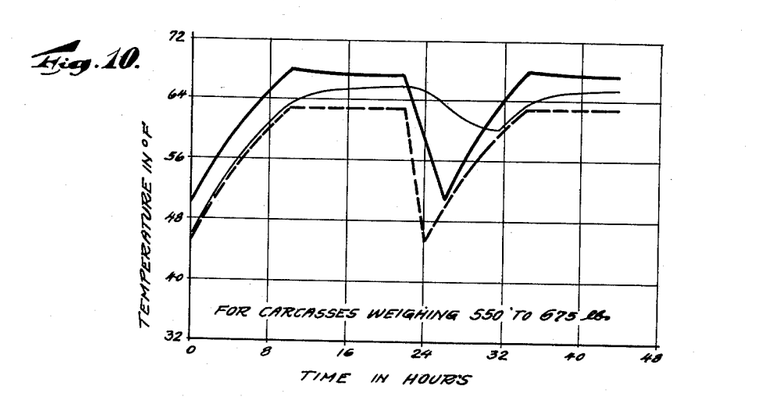
Fig. 10 is a chart corresponding to Fig. 7 except that the carcasses weigh from 550 to 675 pounds.
Figure 11:
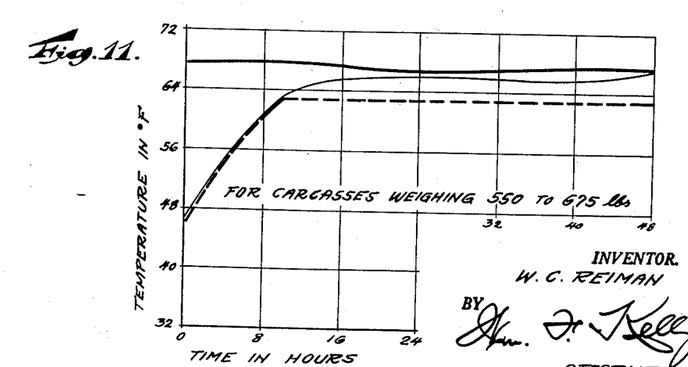
Fig. 11 is a chart corresponding to Fig. 8 except that the carcasses weigh from 550 to 675 pounds.

In Figs. 9, 10 and 11 are shown the operation of the equipment for carcasses which weigh from 550 pounds to 675 pounds and preferably, a slightly longer treatment is required, although the treatment may be shortened somewhat, if desired. The only differences in the operation of the equipment for these larger carcasses are that they require approximately 10 hours to achieve their desired surface temperature and the dew-point and ambient-temperature controls are rotated to vary these temperatures over a ten hour period rather than an eight hour period. Also, the initial dewpoint is set at about 45° F. to compensate for the slightly-lower surface temperature of these larger carcasses, which surface temperature may be about 46° F., for example.

Figure 12:
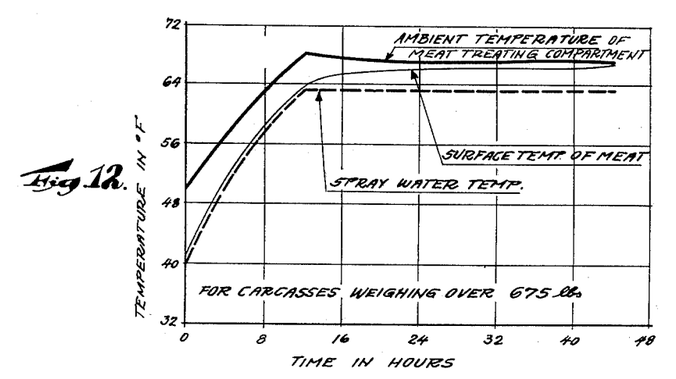
Fig. 12 is a chart corresponding to Fig. 6, but illustrating the various temperature relationships where carcasses weigh over 675 pounds.
Figure 13:
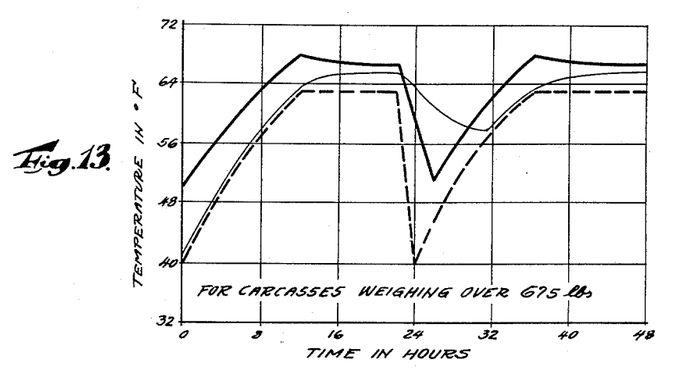
Fig. 13 is a chart corresponding to Fig. 7 except that the carcasses weigh over 675 pounds.
Figure 14:
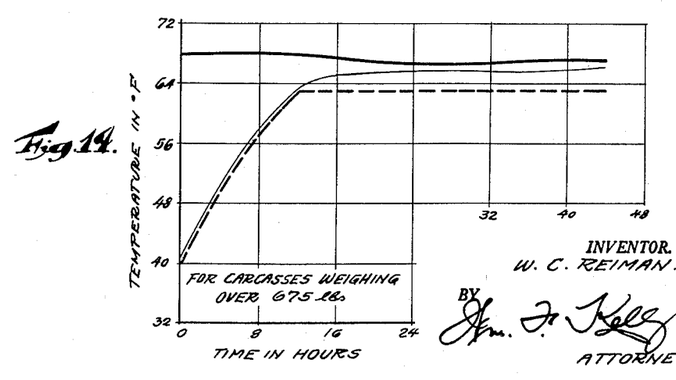
Fig. 14 is a chart corresponding to Fig. 8 except that the carcasses weigh over 675 pounds.

In Figs. 12, 13 and 14 are shown the operation of the equipment for carcasses weighing over 675 pounds. The only substantial differences in the operation of the equipment for these still-larger carcasses are that the dew-point control and when used, the temperature control, are rotated to vary these temperatures over a twelve-hour period as these still-larger carcasses require a slightly longer time to achieve the desired meat surface temperature. Also the initial dew-point is set at about 40° F. to compensate for the slightly-lower surface temperature of these still-larger carcasses, which surface temperature may be about 41° F., for example.

In the foregoing apparatus the dew-point has been varied so that it is always slightly below the surface temperature of the carcasses which are undergoing treatment. As shown, the larger carcasses normally have a surface temperature which is slightly lower than the surface temperature of the smaller carcasses and this calls for some adjustment of the dew-point controls. In addition, the larger carcasses require a slightly longer treating time and this too requires adjustment of the controls. In the preferred operation, the ambient temperature of the compartment is stabilized after initial warming at about 67° F.–68° F. and the dew-point temperature of the compartment is stabilized at about 62½–63½° F. in order to obtain the best results. It should be understood that the operation conditions for the apparatus may be varied considerably. In illustration, the ambient temperature of the compartment may be maintained at about 78° F., for example, and the treating time decreased to about 36 hours, for example. Alternatively, the ambient temperature of the treating compartment may be maintained at about 50° F., for example, and the treating time increased to about 5 days, for example, or the conditions may be varied within these broad ranges. However, the conditions which have been specified are preferred for best operation. Even at the preferred ambient temperature and dew-point, the treating time may be decreased or increased over the desired treating time. For example, for the smaller carcasses a treating time as low as about 24 hours may be used and considerable tenderization will still result. For the larger carcasses, the treating time may be extended to about 54 hours and results will still be satisfactory. Where treating cuts of meat, as opposed to carcasses, the preferred treating time at the referred ambient and dew-point temperatures is from 36 to 42 hours although the treating time may be decreased to 16 hours or increased to 44 hours with generally-satisfactory results. Such variations in treatment may be accomplished by resetting the cams 80 and 80a and stopping and starting these cams as indicated.

In the foregoing curves which demonstrate various modifications for the method of operating the tenderizing apparatus, only the surface temperature of the meat undergoing treatment has been shown, since it is the meat surface temperature and the compartment dew-point which control the condensation of moisture on the surface of the meat. In the actual tenderizing, the most important consideration is the internal temperature of the meat which controls the rate of enzymic action. It has been found that the temperature of the meat carcasses as measured at the center of the round will lag behind the surface temperatures of the meat which is being tenderized. The preferred internal meat temperature for meat tenderizing is from about 64° F. to about 66° F. Carcasses which weigh about 550 pounds, when tenderized in accordance with the operation as shown in Fig. 6, will achieve a center-round internal temperature of about 64° F. after about twenty-four hours in the treating compartment, which is about ten hours after the surface temperature of the carcasses has reached this 64° F. temperature. As these carcasses are kept in the treating room for the rest of the forty-four hour treating period, for example, their center-round internal temperature will gradually increase to about 66° F. Of course, meat portions which are intermediate the center round and surface portions will have temperatures intermediate these values. It can thus be seen that the variable dew-point control operates to keep moisture from forming on the surface of the meat while still keeping the humidity of the treating compartment sufficiently high that moisture losses from the beef are minimized. The ambient-temperature of the compartment operates to raise the whole carcass to a predetermined meat-treating temperature so that enzymic action will be increased. The preferred meat-treating temperature of from about 64° F. to about 66° F. may be extended considerably depending on the tenderizing rate desired and the degree of tenderization desired.

After removing the meat from the treating compartment 20, at the end of the predetermined tenderizing period, it is again chilled at a chill-room temperature of about 34° F. and relative humidity of about 85%–90% until the temperature of the meat at the center of the round is about 40° F. After this the meat is ready for sale.

It has been found that the center-round, internal temperature of the meat will rise faster and reach a higher temperature when the dew-point-control system is employed than when the system previously used is employed, wherein moisture is allowed to condense on the surface of the meat undergoing treatment. In the usual case, the internal temperature of the meat treated with the dew-point control method normally reaches a temperature of 64° F., for example, as much as two or three hours before the meat which has moisture condensed thereon reaches this 64° F. internal temperature. The physical mechanism by which this increased rate of heating is realized is not clearly understood. By way of possible explanation, however, a consideration of the prior-art method, wherein moisture initially condenses on the meat, discloses that in order to minimize such objectionable moisture condensation on the surface of the meat, the dew-point should be kept as low a value as can be tolerated without introducing excessive drying-out of the meat. In actual practice of this prior art method, the relative humidity, which in turn controls the dew-point, is preferably stabilized at the lower end of its useable range, in order to minimize as much as possible any condensation of moisture on the surface of the meat during the initial treating period while the surface of the meat is warming and has moisture condensation thereon. In the instant method, initial moisture condensation on the surface of the meat constitutes no problem as the dew-point is controlled in a variable fashion so that it is always just slightly below the surface temperature of the meat undergoing treatment. Since the dew-point is controlled, a higher ultimate dew-point may be tolerated than in the practices of the prior art where the initial condensation of moisture on the surfaces of the cold meat constitutes a major problem, which moisture condensation is greater with higher dew-points. This slightly-higher ultimate dew-point increases the wet-bulb temperature in the treating compartment accordingly. It has been found that after the initial meat-surface-heating period of eight to twelve hours, for example, the surface temperature of the meat approximates the wet-bulb temperature in the treating compartment and a higher wet-bulb temperature will cause the meat to heat to slightly higher surface and internal temperatures. A relatively high wet-bulb temperature, after the initial meat-surface-heating period, is readily achieved where the dew-point is controlled.

It should be noted that where the dew-point is controlled, the initial compartment-atmosphere wet-bulb temperature during the meat-surface-warming period will be slightly lower than where the dew-point is not controlled. However, in the instant method the initial heating of the surface temperature of the meat to 63° F., for example, is accomplished in approximately the same period as in the practices of the prior art where the dew-point is not controlled, but is held constant. The explanation for this appears to be either the relatively short initial warming period for the surface of the meat, which absorbs heat quite readily in either system, or the fact that the meat surface is always dry where the dew-point is controlled and a dry surface offers considerably more turbulence and heat-absorbing area than a surface which is smooth and slick with moisture condensed thereon.

It will be recognized that the objects of the invention have been achieved by providing a meat-treating method wherein moisture condensation of the surface of the meat undergoing tenderizing is prevented at all times. This has the effect of labor saving, inhibiting bacterial growth and accelerating enzymic action by allowing the meat to heat faster as well as preserving the bloom of the red meat and inhibiting the development of undesirable odors. In addition, various modifications of the basic meat-treating method have been provided.

As a possible alternative embodiment of an apparatus to perform the foregoing method of meat-treating, the compartment ambient temperature may be varied over a predetermined time-temperature schedule by an apparatus as outlined hereinbefore. The dew-point-control equipment may be replaced by a commercially-available humidistat apparatus, which humidistat apparatus is set to maintain the relative humidity at a constant value of from 85% to 90%, for example. Such humidistat apparatus normally incorporates hygroscopic materials such as human hair, wood, bi-wood or animal membrane as the sensing medium and the sensing medium actuates electrical contacts which in turn actuate the humidity-modifying equipment. The better humidistat equipment controls the relative humidity to a few percent and even within 1%. As a specific example, the dew-point-control apparatus as shown in Fig. 4 may be replaced by a commercially-available humidistat. This humidistat may in turn control commercially-available diaphragm-valve positions to open and close the brine-supply globe valve 54 to vary the dew-point accordingly. In this manner, the relative humidity of the atmosphere within the treating compartment will be controlled rather than the dew-point. It should be clear that whether the relative humidity is controlled or whether the dew-point is controlled, the effect is the same and when controlling the relative humidity in such an embodiment, the desired value or values of relative humidity are selected so as to produce the proper dew-points in order to prevent condensation of moisture on the surface of the meat and to prevent drying-out of the meat. It should also be clear that the compartment ambient temperature may be maintained substantially constant and the compartment relative humidity varied in accordance with a predetermined time schedule in order to prevent moisture condensation on the surface of the meat. As an example, the controls for the humidistat may be actuated by a cam arrangement as is shown for the dew-point control of the preferred embodiment. This cam may be cut to vary the humidity from a value of 50%, for example, to a value after eight hours of 85%. For example, the relative humidity of the compartment atmosphere at an ambient temperature of 67° F. and a dew-point of 49° F. (see Fig. 8) is about 52% and the relative humidity of the compartment atmosphere at an ambient temperature of 67° F. and a dew-point of 63° F. (see Fig. 8 after 8 hours operation) is about 87%.

It should be understood that dew-point and ambient-temperature adjustment of the apparatus may be made by hand. This will simplify the equipment, but will require additional operators.

While in accordance with the patent statutes, one best-known embodiment of the invention has been illustrated and described in detail, it is to be particularly understood that the invention is not limited thereto or thereby.

I claim:

1. The process of tenderizing prechilled meat, comprising placing said prechilled meat into a treating compartment for a predetermined meat-treating period, irradiating the surface of said meat with ultraviolet radiations of predetermined intensity during the entire meat-treating period, controlling the ambient temperature of said treating compartment so that the prechilled meat will heat to a predetermined meat-treating temperature, controlling the dew-point of the compartment atmosphere so that initially it is slightly lower than the surface temperature of said prechilled meat, allowing said prechilled meat to heat to said predetermined meat-treating temperature, raising the compartment atmosphere dew-point in accordance with said meat heating and controlling the compartment dew-point so that it is always slightly lower than the surface temperature of said meat, maintaining said meat substantially at said meat-treating temperature for substantially the remainder of said predetermined meat-treating period, and thereafter removing said meat from said compartment.

2. The process of tenderizing prechilled meat, comprising placing said prechilled meat into a treating compartment for a predetermined meat-treating period, irradiating the surface of said meat with ultraviolet radiations of predetermined intensity during the entire meat-treating period, controlling the ambient temperature of said treating compartment so that the prechilled meat will heat to a predetermined meat-treating temperature, controlling the relative humidity of the compartment atmosphere so that it will have a dew-point which initially is slightly lower than the surface temperature of said prechilled meat, allowing said prechilled meat to heat to said predetermined meat-treating temperature, controlling the compartment atmosphere relative humidity in accordance with said meat heating and so that the resulting compartment atmosphere dew-point is always slightly lower than the surface temperature of said meat, maintaining said meat substantially at said meat-treating temperature for substantially the remainder of said predetermined meat-treating period, and thereafter removing said meat from said compartment.

3. The process of tenderizing prechilled meat, comprising placing said prechilled meat into a treating compartment for a predetermined meat-treating period, establishing the ambient temperature of said treating compartment so that the prechilled meat will heat to a predetermined treating temperature, controlling the dew-point of the compartment atmosphere so that initially it is slightly lower than the surface temperature of said prechilled meat, allowing said prechilled meat to heat to said predetermined treating temperature, raising the compartment atmosphere dew-point in accordance with said meat heating and controlling the compartment atmosphere dew-point so that it is always slightly lower than the surface temperature of said meat, irradiating the surface of said meat with ultraviolet radiations of predetermined intensity during the entire meat-treating period, maintaining said meat substantially at said treating temperature for substantially the remainder of said predetermined meat-treating period, and thereafter removing said meat from said compartment.

4. The process of tenderizing prechilled meat, comprising placing said prechilled meat into a treating compartment for a predetermined meat-treating period, controlling the ambient temperature of said treating compartment so that it is somewhat above the temperature of said prechilled meat, controlling the dew-point of the compartment atmosphere so that initially it is slightly lower than the surface temperature of said prechilled meat, gradually raising the ambient temperature of said treating compartment to a predetermined ambient temperature to heat said meat to a predetermined meat-treating temperature, raising the compartment atmosphere dew-point in accordance with said meat heating and controlling the compartment atmosphere dew-point so that it is always slightly lower than the surface temperature of said meat, irradiating the surface of said meat with ultraviolet radiations of predetermined intensity during the entire meat-treating period, maintaining said meat substantially at said treating temperature for substantially the remainder of said predetermined meat-treating period to tenderize said meat, and thereafter removing said tenderized meat from said compartment.

5. The process of tenderizing prechilled meat on a multiple batch basis, comprising placing a first batch of prechilled meat into a treating compartment for a predetermine meat-treating period, controlling the ambient temperature of said treating compartment so that said first batch of prechilled meat will heat to a predetermined meat-treating temperature, controlling the dew-point of the compartment atmosphere so that initially it is slightly lower than the surface temperature of said first batch of prechilled meat, allowing said first batch of prechilled meat to heat to said predetermined meat-treating temperature, raising the compartment atmosphere dew-point in accordance with said first batch heating and controlling the compartment atmosphere dew-point so that it is always slightly lower than the surface temperature of said first-batch meat, thereafter placing a second batch of prechilled meat into said treating compartment for said predetermined meat-treating period and before the meat-treating period for said first batch is completed, controlling the ambient temperature of said treating compartment so that said second batch of prechilled meat will heat to said predetermined meat-treating temperature, controlling the compartment atmosphere dew-point so that it is slightly lower than the surface temperature of said second prechilled batch when placed into said compartment, allowing said second batch of prechilled meat to heat to said predetermined meat-treating temperature, raising said compartment atmosphere dew-point in accordance with said second batch heating and controlling the compartment atmosphere dew-point so that it is always slightly lower than the surface temperature of said second batch, maintaining said first batch in said compartment at said meat-treating temperature for the remainder of said first-batch meat-treating period, irradiating the surface of said meat batches with ultraviolet radiations of predetermined intensity for the entire period said batches are in said treating compartment, and removing said first batch from said compartment when said first batch meat-treating period is completed.

6. The process of tenderizing beef carcasses prechilled to a center round temperature of from 45° F. to 59° F., which process comprises: placing said prechilled meat into a treating compartment; establishing the initial ambient temperature of the compartment so that it is at least 10° F. greater than the surface temperature of the prechilled meat placed therein and does not exceed about 67–68° F.; controlling the ambient temperature of the compartment so that at the end of the initial meat-heating period, which constitutes the first 8 to 12 hours, it is about 67–68° F. with the larger the carcass being tenderized, the longer such initial meat-heating period; establishing the initial dew point of the atmosphere in the compartment at just below the surface temperature of the meat undergoing tenderizing; gradually increasing the dew point of the atmosphere in the compartment through the initial meat-heating period of 8 to 12 hours so that the compartment atmosphere dew point is about 63° F. at the end of such initial meat-heating period; thereafter for about an additional 36 hours maintaining the ambient temperature within the compartment at about 67–68° F. and simultaneously maintaining the dew point temperature within the compartment at about 63° F. to complete meat tenderizing; and irradiating the surface of meat in the compartment with ultraviolet radiations of predetermined intensity during the entire period of meat tenderizing.

7. The process of tenderizing beef carcasses weighing less than 550 pounds and prechilled to a center round temperature of from 54° F. to 59° F., which process comprises: placing said prechilled meat into a treating compartment; establishing the initial ambient temperature of the compartment so that it is at least 10° F. greater than the surface temperature of the prechilled meat placed therein and does not exceed about 67–68° F.; controlling the ambient temperature of said compartment so that at the end of the initial meat-heating period, which constitutes the first 8 hours, it is about 67–68° F.; establishing the initial dew point of the atmosphere in the compartment at just below the surface temperature of the meat undergoing tenderizing; gradually increasing the dew point of the atmosphere in said compartment through the initial meat-heating period of 8 hours so that the compartment atmosphere dew point is about 63° F. at the end of such initial meat-heating period; thereafter for about an additional 36 hours maintaining the ambient temperature within said compartment at about 67–68° F. and simultaneously maintaining the dew-point temperature within said compartment at about 63° F. to complete meat tenderizing; and irradiating the surface of meat in said compartment with ultraviolet radiations of predetermined intensity during the entire period of meat tenderizing.

8. The process of tenderizing beef carcasses weighing from 550 pounds to 675 pounds and prechilled to a center round temperature of from 51° F. to 56° F., which process comprises: placing said prechilled meat into a treating compartment; establishing the initial ambient temperature of said compartment so that it is at least 10° F. greater than the surface temperature of the prechilled meat placed therein and does not exceed about 67–68° F.; controlling the ambient temperature of said compartment so that at the end of the initial meat-heating period, which constitutes the first 10 hours, it is about 67–68° F.; establishing the initial dew point of the atmosphere in the compartment at just below the surface temperature of the meat undergoing tenderizing; gradually increasing the dew point of the atmosphere in said compartment through the initial meat-heating period of 10 hours so that the compartment atmosphere dew point is about 63° F. at the end of such initial meat-heating period; thereafter for about an additional 36 hours maintaining the ambient temperature within said compartment at about 67–68° F. and simultaneously maintaining the dew-point temperature within said compartment at about 63° F. to complete meat tenderizing; and irradiating the surface of meat in said compartment with ultraviolet radiations of predetermined intensity during the entire period of meat tenderizing.

9. The process of tenderizing beef carcasses weighing more than 675 pounds and prechilled to a center round temperature of from 45° F. to 52° F., which process comprises: placing said prechilled meat into a treating compartment; establishing the initial ambient temperature of the compartment so that it is at least 10° F. greater than the surface temperature of the prechilled meat placed therein and does not exceed about 67–68° F.; controlling the ambient temperature of the compartment so that at the end of the initial meat-heating period, which constitutes the first 12 hours, it is about 67–68° F.; establishing the initial dew point of the atmosphere in the compartment at just below the surface temperature of the meat undergoing tenderizing; gradually increasing the dew point of the atmosphere in the compartment through the initial meat-heating period of 12 hours so that the compartment atmosphere dew point is about 63° F. at the end of such initial meat-heating period; thereafter for about an additional 36 hours maintaining the ambient temperature within the compartment at about 67–68° F. and simultaneously maintaining the dew-point temperature within the compartment at about 63° F. to complete meat tenderizing; and irradiating the surface of meat in the compartment with ultraviolet radiations of predetermined intensity during the entire period of meat tenderizing.

10. The process of tenderizing beef carcasses weighing less than 550 pounds and chilled to a center round temperature of 50° F., comprising placing said prechilled meat into a treating compartment, establishing the initial temperature of the treating compartment at 60° F., increasing the ambient temperature of the atmosphere within the treating compartment through an eight hour period to 67° F., establishing the initial dew point of the atmosphere in the compartment at 49° F., increasing the dew point of the atmosphere in the compartment through an eight hour period to 63° F., thereafter for an additional thirty-six hours maintaining the ambient temperature within the compartment at 67° F. and simultaneously maintaining the dew point temperature within the compartment at 63° F. to complete the meat tenderizing, and irradiating the surface of meat in said compartment for the entire meat tenderizing period with ultraviolet radiations of an intensity equivalent to that produced by one ultraviolet generating lamp irradiating fifteen square feet of compartment floor space and producing from twenty to forty microwatts of ultraviolet energy per square centimeter measured at one meter from the lamp.

References Cited in the file of this patent

UNITED STATES PATENTS

| | | |
|---|---|---|
| 2,169,081 | James | Aug. 8, 1939 |
| 2,315,285 | Dennington | Mar. 30, 1943 |
| 2,339,507 | Nagy et al. | Jan. 18, 1944 |
| 2,419,119 | Christensen | Apr. 15, 1947 |
| 2,489,918 | Menges | Nov. 29, 1949 |
| 2,492,308 | Menges | Dec. 27, 1949 |